Oct. 7, 1941.   R. R. EMMITT ET AL   2,257,726
PROCESS OF MAKING A FIBROUS MATERIAL FROM WASTE LEATHER
Filed Oct. 28, 1937
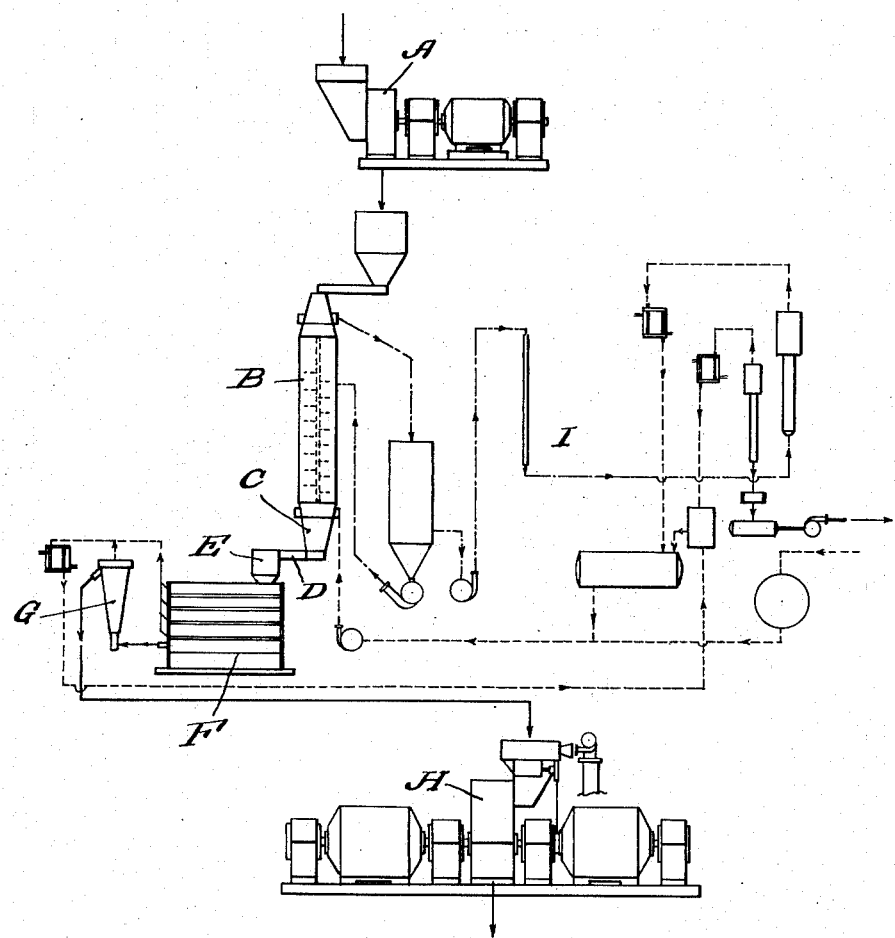
INVENTORS
R. R. Emmitt and
E. L. Schenck
BY
Pattison, Wright & Pattison
ATTORNEYS Patented Oct. 7, 1941

2,257,726

UNITED STATES PATENT OFFICE 2,257,726

PROCESS OF MAKING A FIBROUS MATERIAL FROM WASTE LEATHER

Robert R. Emmitt, Williamsport, and Edward L. Schenck, Muncy, Pa., assignors of one-third to W. Clyde Harer, Williamsport, Pa.

Application October 28, 1937, Serial No. 171,596

2 Claims. (Cl. 83—94)

This invention relates to a process of making from waste leather, such as scrap leather and the like, a fibrous material which can be used for various purposes and by wetting the same, it can be formed into the desired state by twisting, weaving, felting, flocking, screening, rolling, pressing or moulding.

In the manufacture of articles out of leather, there is a great waste in cutting these articles from hides or sheets of leather and the main object of our invention is to convert this scrap leather into a fibrous mass which can be used to form sheets, articles and the like, which articles will have the desired tensile strength without incorporating therein any binder.

We have found by extensive experimenting that the secret of utilizing waste leather to form a fibrous mass is the degreasing of the scrap leather prior to grinding the same as prior to our invention it has been almost impossible to grind waste leather in order to form a fibrous mass which can be used for the purposes desired.

We are aware that prior to our invention many attempts have been made to use waste leather so as to convert it into a mass which could be formed into the desired articles, but all these prior practices attempted to either boil or grind the waste leather to form a mass which could be used commercially and when an attempt was made to grind the waste leather containing the inherent greases, this practice failed. When an attempt was made to boil waste leather to convert it into a froth, the fibers were destroyed and the tensile strength of the resultant mass was very weak when molded and therefore only enabled the mass to be used for limited purposes.

Prior to our invention all attempts to utilize waste leather for forming a fibrous mass which could be used for various purposes, such as forming sheets, threads and molded articles, have failed as it is essential to remove the oil from the waste leather without destroying the fiber before it can be ground so as to produce a fibrous substance having fibers of sufficient length to enable the fibers to be interlaced together to give the material the desired tensile strength without the use of a binder.

We have found in practice that after the material has been thoroughly degreased and ground, the resulting material can be wetted and agitated to interlace the fibers together which enables the fibrous mass to be united into various articles without adding any other kind of material thereto as the inherent substances of the material formed by our process allows the fibers to grow together under the combined action of heat and pressure.

With a fibrous mass produced in accordance with our improved process, the fibers are not injured and can be interlaced after being ground by agitation so as to form a mass which when molded or pressed into the desired shape, will have sufficient tensile strength to be used for a great many purposes.

Other and further objects and advantages of the invention will be hereinafter set forth and the novel features thereof defined in the appended claims.

In carrying out our process, waste leather, such as scrap leather and the like, which is now economically discarded or used as a fuel, is disintegrated in an attrition mill. This forms a mass of spongy-like material as the material is more or less shredded so that the entire surface of each particle thereof is exposed in order to allow the degreasing solvent to thoroughly remove the oils and greases therefrom.

The ground or disintegrated scrap leather thus formed is put in vats and agitated with a solvent, such as ethylene dichloride, isopropyl ether, propylene dichloride, and trichlorethylene so as to remove the grease, residue and the inherent animal oils present therein and we have found in practice that a counter-flow process accomplishes this result very cheaply, but we do not wish to limit ourselves to any particular manner of degreasing the disintegrated mass of scrap leather as we are aware that this can be accomplished in various ways without departing from the spirit of our invention.

We have found that by the above practice we are able to practically remove 100% of the oils and greases of the disintegrated scrap leather by placing it in a vat and agitating the same in a solvent.

The solvent is then removed from the degreased mass, preferably by steam heating or by any of the standard solvent recovering methods whereby the solvent and the residue oils can be recovered and utilized as by-products, and while we have found that the steam heating method is preferable, we do not wish to limit ourselves to any particular method of recovering the solvent from the degreased mass or any particular method of recovering the solvent and residue oil, as our invention relates particularly to the removing of the solvent from the degreased disintegrated mass of scrap leather in order to enable this material thus formed to be thoroughly ground so as to form a fibrous mass.

After the solvent has been removed from the mass, the mass of material is thoroughly dried, preferably by a flow of hot dry air through a rotary drum type of drier or conveyor type of drier so that the moisture is reduced to the lowest practical minimum, for example, $\frac{1}{10}$ of 1% and when in this condition, it can be ground.

The dried mass is then fed into a double plate attrition mill so as to grind the mass or reduce the size of the fibers whereby a soft, felt-like mass of material is formed which can be used for any number of various purposes in the different arts.

The process above described forms a fibrous mass which is free from grease and is in the nature of a soft, felt-like substance which can be readily united as will be hereinafter fully described.

In the drawing we have illustrated a flow sheet of one form of apparatus for carrying out our invention. The small pieces of leather are fed to the single plate attrition mill A where they are disintegrated. The disintegrated mass then pass to a receptacle B containing a solvent where they are agitated for removing the grease therefrom. The degreased particles then pass through solvent extractors C, D and E. The particles are then passed through indirect and direct driers F and G to remove substantially all the moisture therefrom. These dried particles are then fed into a double plate attrition mill H and are discharged therefrom as a soft felt-like mass of fibrous material. A solvent recovering device I is connected to the apparatus as clearly shown.

When it is desired to form a product such as a sheet or article from this fibrous material, the material is wetted and agitated, preferably in a vat of water so as to interlace the fibers of the substance together and the material is then screened or the excess water removed therefrom so that a plastic mass of the desired consistency can be produced which can be readily formed to the desired shape by rolling, pressing or moulding under the combined action of heat and pressure and while we have found that screening is one method of bringing the mass into the desired plastic consistency, we are fully aware that the excess water or moisture can be evaporated therefrom and therefore we do not wish to limit ourselves to the particular manner of producing a mass of the desired consistency as this can be varied without departing from the spirit of our invention.

Any one of the well known methods now in use of moulding material under the combined action of heat and pressure may be employed, as for example, a regular thermo plastic hydraulic press.

As the number of products which can be manufactured from a mass of fibrous material formed in accordance with our invention is unlimited, we have refrained from setting forth the various uses to which this material can be converted as it may be converted into sheets or threads of any desired length and thickness or into an article of the desired size and shape under pressure and can be used as a substitute for paper by forming it into sheets or board and when passed through heated rollers, it is given a calender surface.

The mass of material formed in accordance with our invention contains from 5 to 10% glucose which acts as a binder to enable the mass to be moulded, twisted, pressed or rolled into the desired shape under the combined action of heat and pressure.

While we have found that the product produced will, in a great many cases, be moulded under the combined action of heat and pressure, we do not wish to limit ourselves to any particular means of moulding, twisting or rolling the fibrous mass as we are aware that products can be produced without using heat and pressure.

In the specification the word "degreasing" is used to describe the removal of substantially all the grease, oil and residue; "drying" is used to describe the removal of moisture from the mass; "wetting" is used to describe the conversion of the dry mass into a plastic mass of the desired consistency; "molded" is used broadly to define giving the desired shape to the plastic mass whether this is accomplished by rolling or pressing, with or without heating; "grinding" is used in the broad sense such as the action obtained through an attrition mill; "fibrous material" is used broadly to describe a mass containing fibers; "waste leather" is used broadly to indicate leather having practically no commercial value; and "agitation" is used to indicate the mixing of the water with the substance and the interlacing of the fibers.

From the foregoing description it will be seen that we have provided a method of forming a fibrous material out of waste leather by simply degreasing the waste leather and grinding the same to form a felt-like substance which can be used for various purposes and when wetted and agitated becomes a plastic mass which can be molded into he desired shape with the use of pressure or the combined action of pressure and heat.

When the fibers are in a dry state, they can be twisted into threads and woven into fabric for forming rugs and the like and therefore we do not wish to limit ourselves to any particular means for fabricating the fibers or fibrous mass produced by our process.

What we claim is:

1. The process of making a fibrous material from waste leather without destroying the fibers thereof, which consists in first passing the scrap leather through a grinding machine for mechanically disintegrating the same into small shredded particles, second agitating the mass thus formed in a vat containing a solvent for substantially removing all the grease therefrom including the inherent animal oils, third removing substantially all of the solvent from the degreased mass, fourth passing the mass through a drying apparatus to remove substantially all the moisture therefrom, and finally passing the dried mass through a grinding machine for reducing the size of the fibers to a soft felt-like mass of fibrous material.

2. The process of making a fibrous material from waste leather without destroying the fibers thereof, which consists in first passing the scrap leather through an attrition mill for mechanically disintegrating the same into small shredded particles, second agitating the mass thus formed in a vat containing a solvent for substantially removing all the grease therefrom including the inherent animal oils, third removing substantially all of the solvent from the degreased mass, fourth passing the mass through a drying apparatus to remove substantially all the moisture therefrom, and finally passing the dried mass through a double plate attrition mill for reducing the size of the fibers to a soft felt-like mass of fibrous material.

ROBERT R. EMMITT.
EDWARD L. SCHENCK.